United States Patent [19]

Matsui et al.

[11] Patent Number: 4,732,481
[45] Date of Patent: Mar. 22, 1988

[54] POLARIZATION INTERFEROMETER

[75] Inventors: Shigeru Matsui, Katsuta; Masaru Inoue, Mito, both of Japan

[73] Assignee: Hitachi, Ltd., Tokyo, Japan

[21] Appl. No.: 42,244

[22] Filed: Apr. 24, 1987

[30] Foreign Application Priority Data

Apr. 25, 1986 [JP] Japan .................................. 61-94528

[51] Int. Cl.$^4$ ............................................... G01B 9/02
[52] U.S. Cl. ..................................... 356/346; 356/351
[58] Field of Search ................................. 356/346, 351

[56] References Cited

U.S. PATENT DOCUMENTS 4,072,422  2/1978  Tanaka et al. .................. 356/351 X
4,320,973  3/1982  Fortunato et al. .................... 356/346

OTHER PUBLICATIONS

Balasubramanian et al., "A New Approach to High Precision Phase Measurement Interferometry", *Proc. SPIE*, vol. 230, pp. 180–190, 1980.

*Primary Examiner*—Davis L. Willis
*Assistant Examiner*—Matthew W. Koren
*Attorney, Agent, or Firm*—Antonelli, Terry & Wands

[57] ABSTRACT

A polarization interferometer includes a light source to be measured, a Wollaston prism, a pair of polarizers arranged in such a manner that the Wollaston prism is interposed between the polarizers and the plane of polarization of each polarizer is inclined at 45° to each of two crystallographic axes of the Wollaston prism, a photodetector for detecting an interference fringe which is spatially formed by two light beams separated by the Wollaston prism, changeover means for causing one of the polarizers to changeover from one of polarizing and non-polarizing states to the other state, memory means for storing a first output signal which is delivered from the photodetector in a state that one polarizer is kept at the non-polarizing state, and means for dividing a second output signal which is delivered from the photodetector in a state that one polarizer is kept at the polarizing state, by the first output signal stored in the memory means.

8 Claims, 7 Drawing Figures

POLARIZATION INTERFEROMETER

BACKGROUND OF THE INVENTION

The present invention relates to a polarization interferometer, and more particularly to a polarization interferometer which includes a multi-channel photodetector and is suitable for use in an interference spectroscope and a film-thickness measuring apparatus utilizing interference.

In a conventional polarization interferometer, as described in Japanese patent application JP-A-No. 59105,508, an interferogram formed spatially by an optical system in which a Wollaston prism is interposed between a pair of polarizers, is detected by a multi-channel photodetector. In the above interferometer, however, attention is not paid to the non-uniform intensity distribution of a light beam at a light receiving surface and variations in sensitivity at detection elements of the multi-channel photodetector. In more detail, in a conventional polarization interferometer provided with a multi-channel photodetector, the detection elements of the photodetector are placed at different spatial positions, and hence optical paths to the detection elements are different from each other. Owing to the change in optical path length and aberrations of an optical system, the intensity distribution of a light beam at the multi-channel photodetector is not uniform. Moreover, the detection elements do not always have the same photo-sensitivity, and the difference in sensitivity among the detection elements makes the outputs thereof different from one another. Thus, distortion occurs in an interferogram signal delivered from the photodetector.

SUMMARY OF THE INVENTION

It is an object of the present invention to provide a polarization interferometer which can compensate the nonuniform light intensity distribution at detection elements and variations in sensitivity thereof, and can form a distortion free interferogram.

In order to attain the above object, according to the present invention, there is provided a polarization interferometer, in which one of two polarizers disposed on both sides of a Wollaston prism can change over from one of polarizing and non-polarizing states to the other state, a detection signal obtained in the non-polarizing state of one polarizer is stored in a memory, and another detection signal obtained in the polarizing state of one polarizer is divided by the stored detection signal, to obtain a distortion free interferogram signal.

DESCRIPTION OF THE PREFERRED EMBODIMENTS

Figure 1:
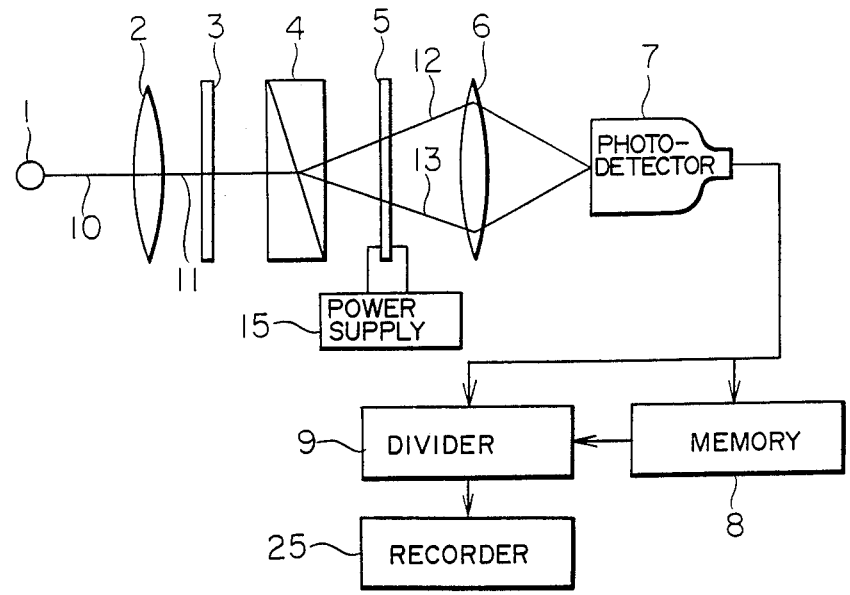
FIG. 1 is a block diagram showing an embodiment of a polarization interferometer according to the present invention.

FIG. 1 shows an embodiment of a polarization interferometer using a Wollaston prism, according to the present invention.

Referring to FIG. 1, a light beam 10 emitted from a light source 1 which is to be measured, passes through a collimator 2 to be converted into a light beam 11 formed of parallel rays, and is then incident upon a Wollaston prism 4 through a first polarizer 3. The Wollaston prism 4 is usually formed by joining two wedge-shaped birefringent prisms together so that the crystallographic axes of the two prisms are perpendicular to each other. The first polarizer 3 is disposed so that the plane of polarization thereof is inclined at 45° to each of the crystallographic axes of the two prisms. Thus, the Wollaston prism 4 splits the incident light beam into two light beams having the same light quantity. Light beams 12 and 13 separated by the Wollaston prism 4 pass through a second polarizer 5. The second polarizer 5 is formed of a liquid crystal plate, and can change over from one of polarizing and non-polarizing states to the other state by turning on or off a power supply 15 connected to the liquid crystal plate. The second polarizer 5 is disposed so that the plane of polarization of the second polarizer 5 in the polarizing state is parallel to or inclined at 90° to the plane of polarization of the first polarizer 3. The plane of polarization of the second polarizer 5 makes an angle of 45° or −45° with the plane of polarization of each of the light beams 12 and 13. Thus, the light beams 12 and 13 are recombined so as to form an interference fringe. Accordingly, an interference fringe which is formed, as a virtual image, in the Wollaston prism 4, is enlarged and focused on the light receiving surface of a photodetector 7 by a focusing lens 6.

When a direction parallel to the paper containing FIG. 1 and perpendicular to the traveling direction of the light beam 11 is expressed by an X-direction, a direction perpendicular to the above paper and the X-direction is expressed by a X-direction, the intensities of the light beams 12 and 13 having a single wavelength component are expressed by $I_1$ and $I_2$, respectively, and the phase difference between the light beams 12 and 13 is expressed by $\delta$, the intensity $I_a$ of that component of the resultant light of the light beams 12 and 13 which is parallel to the plane of polarization of the second polarizer, and the intensity $I_b$ of that component of the resultant light which is perpendicular to the plane of polarization of the second polarizer 5 are given by the following equations:

$$I_a = \frac{I_1}{2} + \frac{I_2}{2} + \sqrt{I_1 I_2} \cos\delta(x) \qquad (1)$$

$$I_b = \frac{I_1}{2} + \frac{I_2}{2} - \sqrt{I_1 I_2} \cos\delta(x) \qquad (2)$$

When the second polarizer 5 is put in the polarizing state, the intensity $I_b$ becomes equal to zero, since the component perpendicular to the plane of polarization of the second polarizer 5 is blocked by the polarizer 5. Thus, the intensity I (x, y) of an interference fringe which is formed on an x-y plane by the single wavelength component, is given by the following equation:

$$I(x,y) = \frac{I_1}{2} + \frac{I_2}{2} + \sqrt{I_1 I_2} \cos\delta(x) \quad (3)$$

The intensities $I_1$ and $I_2$ are not necessarily constant on the x-y plane where the interference fringe is formed. Now, let us express the intensity distribution of the light beam 12 at the x-y plane and the intensity distribution of the light beam 13 at the x-y plane by $I_1(x, y)$ and $I_2(x, y)$, respectively. Since the light beams 12 and 13 are separated by the first polarizer 3 and the Wollaston prism 4 so as to have the same light intensity, we can obtain the following equation:

$$I_1(x, y) = I_2(x, y) \quad (4)$$

Accordingly, the equation (3) can be rewritten as follows:

$$I(x, y) = I_1(x, y) \cdot \{1 + \cos\delta(x)\} \quad (5)$$

Further, since the interference fringe having the intensity distribution $I(x, y)$ is focused on the photodetector 7 by the focusing lens 6, it is necessary to take the non-uniformity of photo-sensitivity at the light receiving area of the photodetector 7 into consideration. Now, let us consider x- and y-coordinate axes on the light receiving surface of the photodetector 7. When the magnification of the focusing lens 6 and the sensitivity distribution on the light receiving surface of the photodetector 7 are expressed by k and $D(x, y)$, respectively, an interferogram signal $A(x, y)$ obtained from the photodetector 7 is given by the following equation:

$$A(x,y) = D(x,y) \cdot I\left(\frac{x}{k}, \frac{y}{k}\right)$$
$$= D(x,y) \cdot I_1\left(\frac{x}{k}, \frac{y}{k}\right)\left\{1 + \cos\delta\left(\frac{x}{k}\right)\right\} \quad (6)$$

where each of $A(x, y)$ and $D(x, y)$ indicates a distribution function on the light receiving surface of the photodetector 7, and each of $I(x/k, y/k)$, $I_1(x/k, y/k)$ and $\cos\delta(x/k)$ indicates a distribution function or cosine function at the above-mentioned x-y plane on the light source side of the focusing lens 6.

When the second polarizer 5 is put in the non-polarizing state, two components of the resultant light of the light beams 12 and 13 (that is, the component parallel to the plane of polarization of the second polarizer 5 and the component perpendicular to the above plane of the polarization) can pass through the second polarizer 5. Accordingly, when the intensity distribution of the sum of the two components on the x-y plane at a time the second polarizer 5 is kept at the non-polarizing state and an output signal delivered from the photodetector 7 at the above time are expressed by $I'(x, y)$ and $A'(x, y)$, respectively, we can obtain the following equations:

$$I'(x,y) = I_1(x,y) + I_2(x,y) = 2I_1(x,y) \quad (7)$$

$$A'(x,y) = D(x,y)I'\left(\frac{x}{k}, \frac{y}{k}\right) = 2D(x,y)I_1\left(\frac{x}{k}, \frac{y}{k}\right) \quad (8)$$

The above output signal $A'(x, y)$ is stored in a memory 8. Further, both the interferogram signal $A(x, y)$ obtained in the polarizing state of the second polarizer 5 and the stored signal $A'(x, y)$ are applied to a divider 9, to divide the signal $A(x, y)$ by the signal $A'(x, y)$, thereby obtaining a corrected interferogram signal $A''(x, y)$, which is given by the following equation:

$$A''(x,y) = A(x,y)/A'(x,y) = \frac{1 + \cos\left(\frac{\delta}{k}\right)}{2} \quad (9)$$

The corrected interferogram signal $A''(x, y)$ is recorded on a recording medium by a recorder 25. As can be seen from the equation (9), the corrected interferogram $A''(x, y)$ is not affected by the intensity distribution of the light beams 12 and 13 at the x-y plane and the non-uniform photo-sensitivity at the light receiving area of the photodetector 7.

In the above, explanation has been made of a case where the light beams 12 and 13 have only a single wavelength component. In a case where the light beams 12 and 13 have a plurality of wavelength components or continuous wavelength distribution, the interference fringe formed by the light beams 12 and 13 is the sum of interference fringes due to a plurality of wavelength components, and hence a corrected interferogram signal can be obtained in the above-mentioned manner.

In the present embodiment, the second polarizer 5 can change over from one of polarizing and non-polarizing states to the other state. Alternatively, the first polarizer 3 may changeover from one of the above states to the other state, instead of the second polarizer 5.

In the foregoing explanation, a two-dimensional image of interference fringe on an x-y plane is detected by the photodetector 7. Alternatively, a one-dimensional photodetector may be used for detecting the image of interference fringe.

Next, explanation will be made of an interference spectroscope including another embodiment of a polarization interferometer according to the present invention, with reference to FIG. 2.

Figure 2:
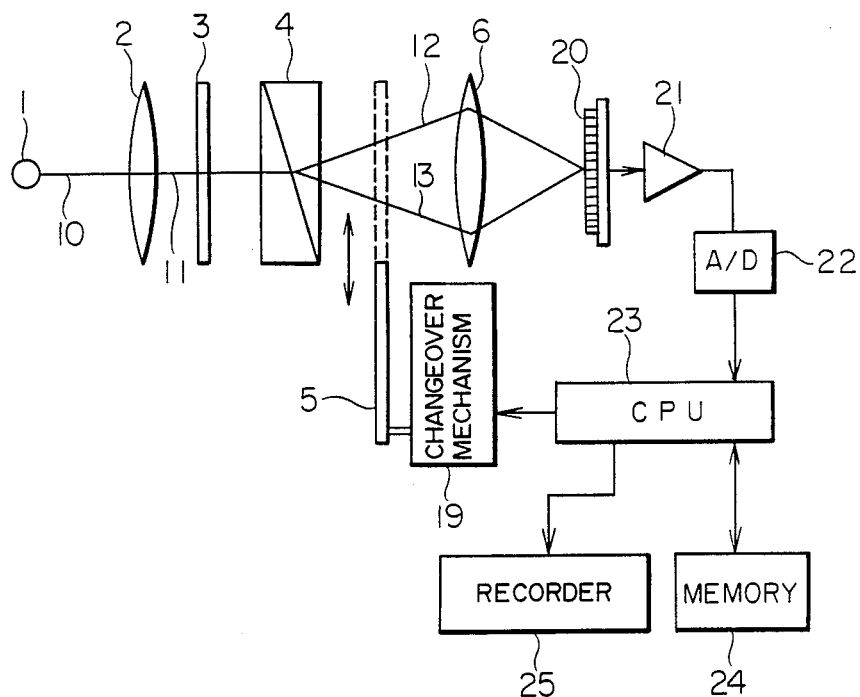
FIG. 2 is a block diagram showing an interference spectroscope which includes another embodiment of a polarization interferometer according to the present invention.

Referring to FIG. 2, the light beam 10 emitted from the light source 1 which is to be measured, passes through the collimator 2 to be converted into the light beam 11 formed of parallel rays, and is then incident upon the Wollaston prism 4 through the first polarizer 3. The first polarizer 3 is disposed so that the plane of polarization thereof is inclined at 45° to each of two crystallographic axes of the Wollaston prism 4, and thus the two light beams 12 and 13 separated by the Wollaston prism have the same light quantity. The light beams 12 and 13 pass through the second polarizer 5, which is disposed so that the plane of polarization of the second polarizer 5 is inclined at 90° to the plane of polarization of the first polarizer 3. Further, the second polarizer 5 is put in and withdrawn from an optical path by a polarizer changeover mechanism 19. The changeover mechanism 19 of FIG. 2 uses a rack and pinion adjuster to slide the second polarizer 5. Alternatively, the changeover mechanism 19 may use a shutter mechanism to rotate the second polarizer 5. Further, the second polarizer 5 may changeover from one of polarizing and non-polarizing states to the other state by turning on or off a power supply connected to the second polarizer 5, as shown in FIG. 1. The light beams 12 and 13, each of which is linearly polarized, are recombined with the aid of the second polarizer 5 so that an interference fringe is formed. An interference fringe which is formed, as a virtural image, in the Wollaston prism 4, is focused, by the focusing lens 6, on the light receiving surface of a one-dimensional multi-channel photodetector 20 such as a photodiode array, and photo-electric conversion is carried out by the photodetector 20. Thus, an interferogram signal corresponding to sampled values of the interference fringe is delivered from the photodetector 20. The interferogram signal is amplified by an amplifier 22, and then converted by an analog-to-digital converter 22 into a digital signal, which is loaded in a microcomputer (or central processing unit) 23. The one-dimensional multi-channel photodetector 20 may be replaced by a two-dimensional multi-channel photodetector such as a television camera.

At first, the microcomputer 23 controls the polarizer changeover mechanism 19 so that the second polarizer 5 is withdrawn from the optical path. An output signal which is obtained from the one-dimensional multi-channel photodetector 20 in the above state, is stored, as a background signal, in a background-signal storing memory 24. Next, the microcomputer 23 again controls the polarizer changeover mechanism 19 so that the second polarizer 5 is put in the optical path, and fetches an interferogram signal which is obtained in this state, to make a corrected interferogram signal in the following manner. That is, signal levels of the interferogram signal corresponding to sampled values of the interference fringe are divided by corresponding signal levels of the background signal, to obtain the corrected interferogram signal. The corrected interferogram signal is subjected to Fourier transformation, to obtain the emission spectrum of the light source 1. The spectrum is recorded by the recorder 25. A display device or memory may be used in place of the recorder 25.

Figure 3A:
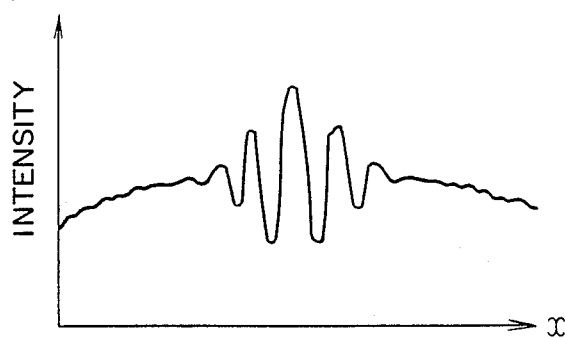
FIGS. 3A, 3B and 3C are graphs for explaining the present invention, and show an interferogram before correction, a background and an interferogram after correction, respectively.

FIG. 3A shows an example of an uncorrected interferogram signal for white light. As shown in FIG. 3A, in an interferometer for forming an interference fringe spatially, a peripheral portion of the interference fringe is usually smaller in light quantity than a central portion thereof.

Figure 3B:
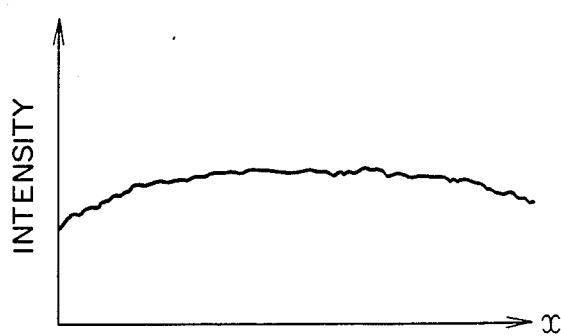
Figure 3C:
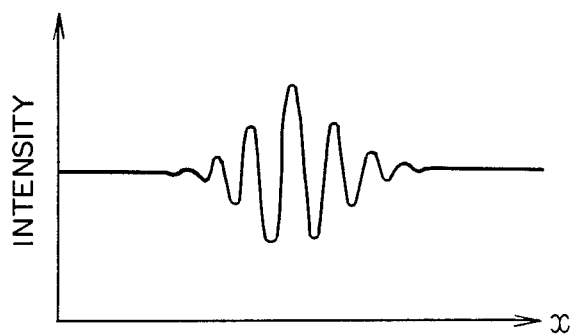
Figure 4A:
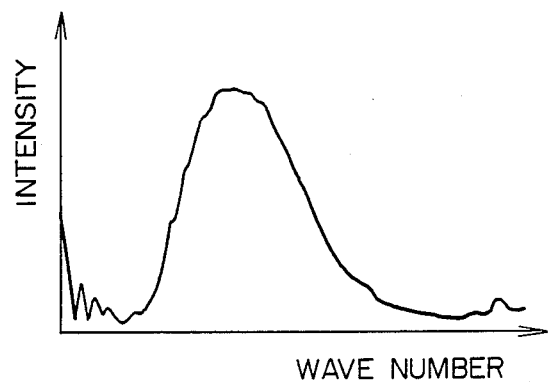
FIGS. 4A and 4B are graphs showing a spectrum which is obtained by carrying out Fourier transformation for the interferogram of FIG. 3A, and a spectrum which is obtained by carrying out Fourier transformation for the interferogram of FIG. 3C, respectively.
Figure 4B:
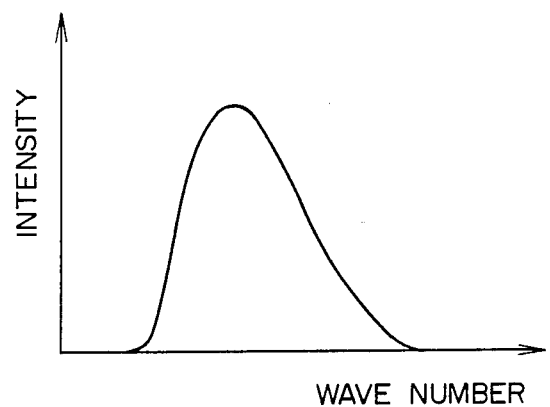

Further, owing to variations in sensitivity at the detection elements of the multi-channel photodetector, noise such as random noise is observed throughout the uncorrected interferogram signal, as shown in FIG. 3A. FIG. 4A shows a spectrum which is obtained by carrying out Fourier transformation for the uncorrected interferogram signal of FIG. 3A. Owing to the distortion of the uncorrected interferogram signal, the zero level of the spectrum of FIG. 4A is lifted from a base line, and this spectrum contains noise, which reduces the S/N ratio. FIG. 3B shows a background signal which is obtained for the same light source in a state that the second polarizer 5 is withdrawn from the optical path. As is apparent from FIGS. 3A and 3B, the background signal shows the reduction in light quantity at the peripheral portion as in the uncorrected interferogram signal, and contains noise due to variations in sensitivity at detection elements of the photodetector, in the whole range as in the uncorrected interferogram signal. Hence, when the uncorrected interferogram signal of FIG. 3A is divided by the background signal of FIG. 3B, a distortion-free corrected interferogram signal is obtained, as shown in FIG. 3C. FIG. 4B shows a spectrum which is obtained by carrying out Fourier transformation for the corrected interferogram signal of FIG. 3C. Apparently, the spectrum of FIG. 4B has less noise and distortion than the spectrum of FIG. 4A.

As mentioned above, according to the present interference spectroscope, even when each of two light beams formed of parallel light rays for forming an interference fringe has non-uniform intensity distribution on a plane perpendicular to the traveling direction of the light beam and variations in sensitivity are observed at a plurality of detection elements of a multi-channel photodetector, an interferogram signal which is small in distortion can be obtained without being affected by the above non-uniform intensity distribution and variations in sensitivity at the detection elements. Further, by carrying out Fourier transformation for the above interferogram signal, a spectrum can be obtained which is low in noise level and small in distortion.

We claim:

1. A polarization interferometer comprising:
   a light source to be measured;
   a Wollaston prism for splitting light from said light source into two light beams;
   a pair of polarizers disposed before and behind said Wollaston prism in the traveling direction of the light from said light source, the plane of polarization of each polarizer being inclined at 45° to each of two crystallographic axes of said Wollaston prism;
   means for spatially forming an interference fringe by said two light beams from said Wollaston prism;
   detection means for detecting said interference fringe formed by said interference-fringe forming means;
   changeover means for putting one of said polarizers in a non-polarizing state;
   memory means for storing a first detection signal which is obtained from said detection means in a state that said one polarizer is put in the non-polarizing state by said changeover means; and
   means for dividing a second detection signal which is obtained from said detection means in a state that said one polarizer is put in a polarizing state by said changeover means, by the first detection signal stored in said memory means, and for outputting the result of the division.

2. A polarization interferometer according to claim 1, wherein said detection means is a multi-channel photodetector.

3. A polarization interferometer according to claim 2, wherein said memory means stores first detection signals from a plurality of detection elements of said multi-channel photodetector, and said division/output means divides second detection signals from said detection elements of said multi-channel photodetector by corresponding ones of the second detection signals stored in said memory means.

4. A polarization interferometer according to claim 2, wherein said multi-channel photodetector is a one-dimensional multi-channel photodetector.

5. A polarization interferometer according to claim 2, wherein said multi-channel photodetector is a two-dimensional multi-channel photodetector.

6. A polarization interferometer according to claim 1, wherein said one polarizer can changeover from one of polarizing and non-polarizing states to the other state by varying a voltage applied to said one polarizer, and said changeover means is power supply means capable of varying the voltage applied to said one polarizer.

7. A polarization interferometer according to claim 1, wherein said changeover means is means for putting said one polarizer in an optical path and for withdrawing said one polarizer from said optical path.

8. A polarization interferometer according to claim 1, further comprising a recorder for recording an output signal from said division/output means.

* * * * *